United States Patent
Lund

(10) Patent No.: US 9,920,598 B2
(45) Date of Patent: Mar. 20, 2018

(54) CABLING SYSTEM CORRUGATED CENTERTUBE UMBILICAL

(75) Inventor: Sjur Kristian Lund, Halden (NO)

(73) Assignee: NEXANS, Paris (FR)

( * ) Notice: Subject to any disclaimer, the term of this patent is extended or adjusted under 35 U.S.C. 154(b) by 455 days.

(21) Appl. No.: 13/233,067

(22) Filed: Sep. 15, 2011

(65) Prior Publication Data
US 2012/0080115 A1 Apr. 5, 2012

(30) Foreign Application Priority Data
Sep. 30, 2010 (NO) .................................. 20101361

(51) Int. Cl.
| | |
|---|---|
| F16L 9/06 | (2006.01) |
| E21B 43/01 | (2006.01) |
| E21B 17/20 | (2006.01) |
| F16L 11/22 | (2006.01) |
| E21B 17/01 | (2006.01) |
| E21B 19/00 | (2006.01) |
| F16L 9/147 | (2006.01) |
| F16L 11/15 | (2006.01) |

(52) U.S. Cl.
CPC .......... *E21B 43/0107* (2013.01); *E21B 17/01* (2013.01); *E21B 17/017* (2013.01); *E21B 17/203* (2013.01); *E21B 19/004* (2013.01); *F16L 11/22* (2013.01); *F16L 9/06* (2013.01); *F16L 9/147* (2013.01); *F16L 11/15* (2013.01)

(58) Field of Classification Search
CPC .... E21B 43/0107; E21B 17/01; E21B 17/017; E21B 17/203; E21B 19/004; F16L 11/22; F16L 9/06; F16L 9/147; F16L 11/15
USPC .......................................... 138/121, 173, 137
See application file for complete search history.

(56) References Cited

U.S. PATENT DOCUMENTS

| | | | | |
|---|---|---|---|---|
| 3,580,289 | A * | 5/1971 | James et al. ................... | 138/121 |
| 4,261,671 | A * | 4/1981 | Langner ........................ | 405/166 |
| 6,006,788 | A | 12/1999 | Jung et al. | |
| 6,039,083 | A * | 3/2000 | Loper ............................ | 138/135 |
| 6,053,213 | A * | 4/2000 | Jung et al. .................... | 138/130 |
| 7,493,918 | B2 * | 2/2009 | Thomson ...................... | 138/130 |
| 2006/0144456 | A1 * | 7/2006 | Donnison et al. ............ | 138/121 |

FOREIGN PATENT DOCUMENTS

| | | |
|---|---|---|
| GB | 2326177 | 12/1998 |
| GB | 2395539 | 5/2004 |

OTHER PUBLICATIONS

Search Report dated Mar. 23, 2011.

* cited by examiner

*Primary Examiner* — Nicholas J Weiss
(74) *Attorney, Agent, or Firm* — Sofer & Haroun, LLP

(57) ABSTRACT

An umbilical (2) has a center tube (4) that is a steel tube, and that the cross section of the center tube (4) at the extremity of the umbilical (2) is made corrugated on a length that extends substantially from the extremity to a distance from the extremity so that fatigue strain on non corrugated parts of the steel tube is avoided when the extremity of the umbilical (2) is inserted into a bend stiffener (1).

6 Claims, 3 Drawing Sheets

US 9,920,598 B2

CABLING SYSTEM CORRUGATED CENTERTUBE UMBILICAL

RELATED APPLICATION

This application claims the benefit of priority from Norwegian Patent Application No. 2010 1361, filed on Sep. 30, 2010, the entirety of which is incorporated by reference.

FIELD OF INVENTION

The present invention relates to umbilicals comprising a center tube. More specifically it relates to transition from center tubes in umbilicals to bend stiffeners, for example to center tubes in umbilicals to bend stiffeners adapted for improving fatigue life of large center tubes in dynamic umbilicals.

BACKGROUND OF THE INVENTION

Umbilicals are widely used in offshore oil production. In a dynamic umbilical, a large diameter Super Duplex center tube is a preferred part. At sea the there is often a harsh environment with waves making oil platforms and the like move dynamically. An umbilical, connecting the sea bottom with an oil platform, will get forces applied resulting in induced geometrical deformation. This deformation will in turn lead to metal fatigue resulting in reduced lifetime for the umbilical. This is particularly the case for the center tube or center tubes. The degree of deformation is proportional to the diameter of a tube. One way of overcoming this problem is to replace said large center tube by several smaller tubes. For instance one 50 mm tube can be replaced by 7 smaller tubes, each having a diameter of 25 mm. The smaller tubes have to have greater total net cross section due to the fact that flow resistance increases with the smaller tubes. Such designs are significantly more expensive than a solution with just one larger center tube.

The area where umbilicals are subject to fatigue problems is primarily near the end part of the umbilical where it is terminated in the top side of a platform structure or vessel. Below the platform, an umbilical will pass through a bend stiffener. This is a common way of reducing the strain on an umbilical. A bend stiffener is normally conically tapered with a wide end on the upside where the umbilical is terminated and a thin end on the other side where the umbilical extends downwards.

The task of the bend stiffener is to spread the movement of the umbilical over some limited distance so that the bending radius of the umbilical is increased. In this way, forces on critical components like central tubes are not concentrated just at the point of entrance of the umbilical to the platform but spread along the bend stiffener. One problem with bend stiffeners is that central tubes with an inner diameter of 35 mm to 80 mm and even more, and with a wall thickness of 2 mm to 7 mm or more are rather stiff. This size tolerates only quite large bending diameters in order not to fail due to fatigue stress during its required lifetime. Bend stiffeners are made in lengths up to and even more than 7.5 meters. Bend stiffeners this long are difficult and expensive to produce and this is therefore is a problem.

Super Duplex is a well known material in the umbilical business and production of the tubes is well documented. The business has a long track record of production of such tubes, cables and termination. Extensive testing and field experience in the area adds to that.

A large Super Duplex center tube instead of several smaller Super Duplex tubes in an umbilical results in a much cheaper umbilical.

SUMMARY OF THE INVENTION

The present invention seeks to provide an improved connection between an oil platform and an umbilical that addresses one or more of the aforementioned problems associated with known ways of designing such connections. These problems concern cost as well as problems related to expected hash environments of such installations.

According to a first aspect of the present invention, an umbilical comprises a center tube being a steel tube and the cross section of said center tube, at the extremity of said umbilical, is made corrugated on a length that extends substantially from said extremity to a distance from said extremity so that fatigue strain on non corrugated parts of said steel tube is avoided when the extremity of said umbilical is inserted into a bend stiffener.

Optionally, for the center tube end section, said steel tube is made of Super Duplex steel.

Optionally, for the center tube end section, said steel tube is sheathed with a polyethylene sheath.

Optionally, for the center steel tube end section being sheathed with a polyethylene sheath, a volume between the corrugated steel tube and the polyethylene sheath is filled with elastomer or soft polymer.

The invention also relates to a Platform comprising a bend stiffener, hang-off topside and an umbilical according to the invention. The main technical feature of a platform according to the invention is that the cross section of the umbilical center tube inside the bend stiffener is made corrugated on a length corresponding to 70% of the total length of said bend stiffener.

Advantageously, that is the upper part of the umbilical center tube inside the bend stiffener, of which the cross section is made corrugated.

DESCRIPTION OF THE DIAGRAMS

The present invention will now be described, by way of example, with reference to the following diagrams wherein.

DETAILED DESCRIPTION OF THE INVENTION

Figure 1:
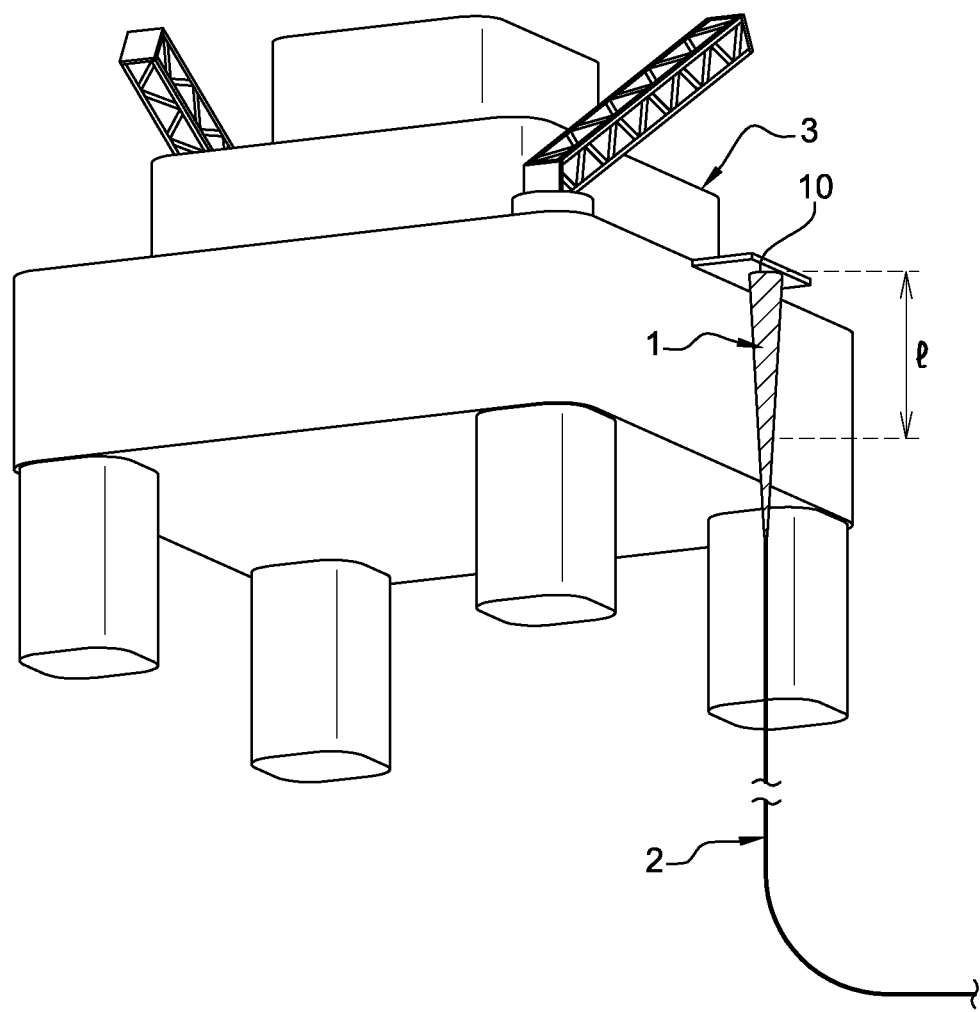
FIG. 1 is a schematic illustration of an embodiment of a platform with an installed umbilical.
Figure 2:
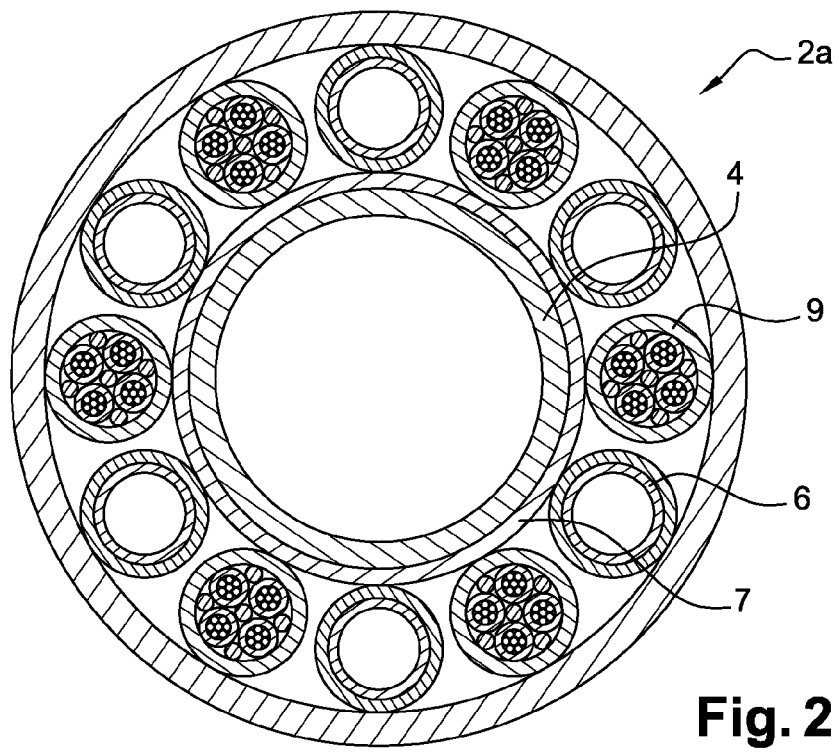
FIG. 2 is a schematic illustration of a cross section of an umbilical with one large diameter Super Duplex center tube.

Referring to FIG. 1, a schematic platform 3 installation according to the present installation is shown. The actual invention is to be found inside a part of an umbilical 2 starting from the platform 3 through an umbilical bend stiffener 1 and further down some limited distance. An umbilical 2 may be quite long, typically ranging from a few kilometers to 40 kilometers or more. It is expensive, not only due to its length, but also because of its complex construction. Referring to FIG. 2, an umbilical 2a is designed to convey different matter like produced oil and gas, usually in a center tube 4 surrounded by a polyethylene sheath 7, electric power in electrical cables 9, hydraulic power and other liquids in diverse supplementary tubes 6, optical signals (not shown), electrical signals (not shown), etc., possibly in different directions, all integrated in the umbilical 2.

One important component when terminating an umbilical 2 to a platform 3 is a bend stiffener 1. A bend stiffener 1 is typically designed comprising a plurality of parts not to be covered here. It surrounds the upper end of an umbilical 2 and is fixed to the platform 3 while in the other end it is designed to be flexible to some degree. The purpose of the bend stiffener 1 is to spread the dynamic movement of the umbilical 2 on its inside so that it gets evenly distributed along the length of the bend stiffener 1.

Figure 3:
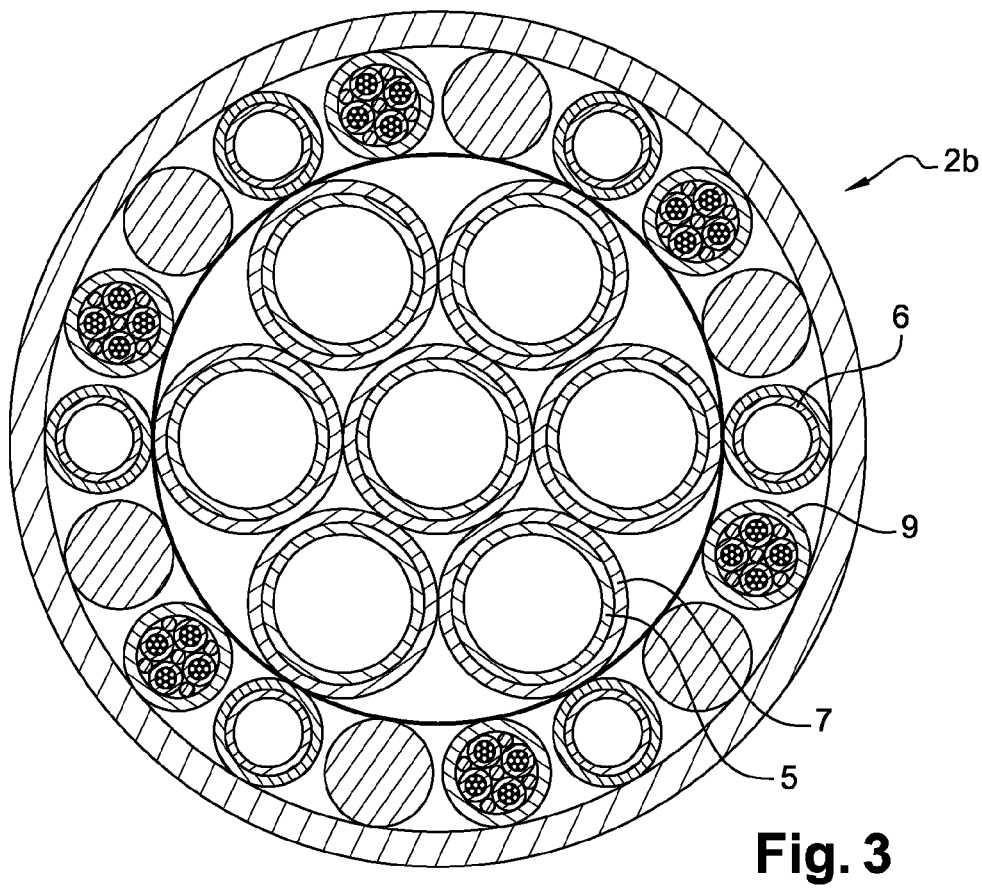
FIG. 3 is a schematic illustration of a cross section of an umbilical with seven smaller diameter Super Duplex center tubes.

The stiffer an umbilical 2 gets, the longer and bigger the bend stiffener 1 has to be. The same relates to dynamic movement, more dynamic movement also requires longer bend stiffeners 1. If it is desirable to use a large Super Duplex center tube 4 of say 50 mm in an umbilical 2a, there are also two available options in the art; referring to FIG. 3 umbilical 2b may comprise seven smaller tubes 5 of 25 mm, each being surrounded by a polyethylene sheath 7, said smaller tubes 5 replacing the larger center tube 4. Another option is to use an extremely long bend stiffener 1. Both these alternatives make the umbilical 2 significantly more expensive.

Figure 4:
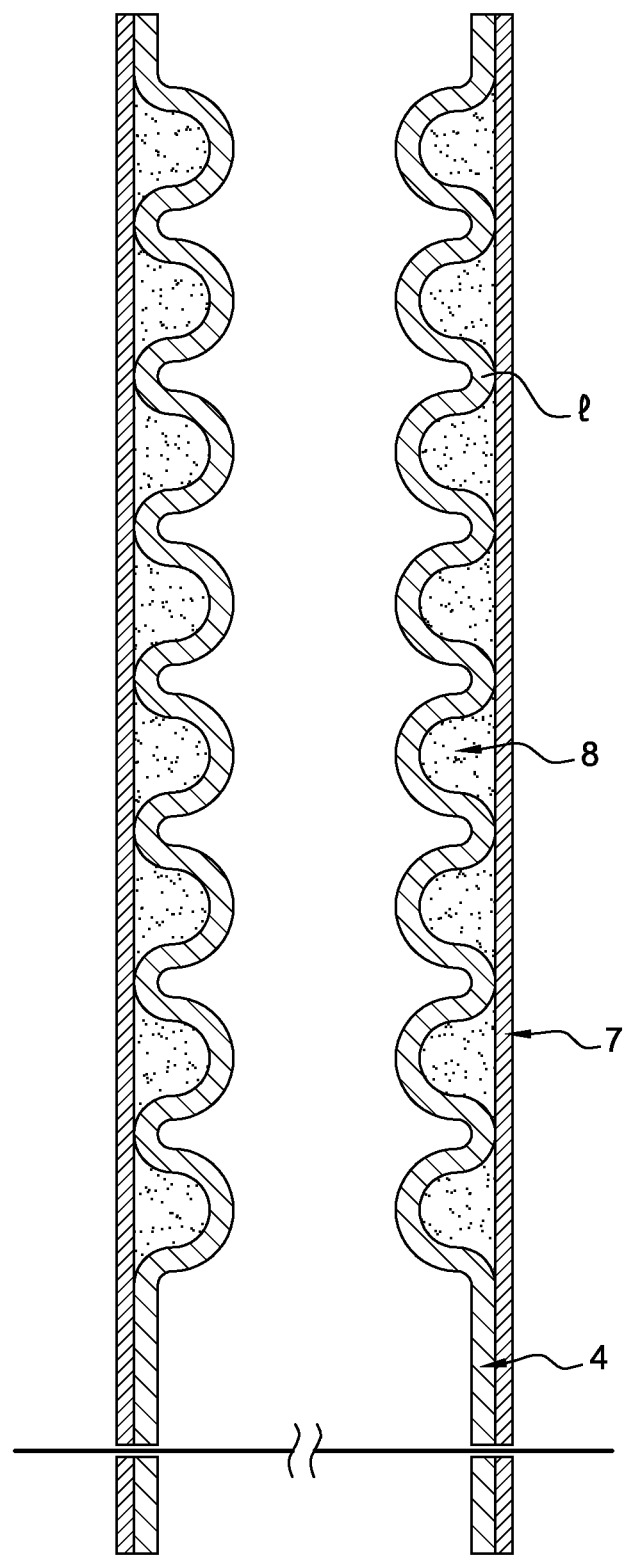
FIG. 4 is a longitudinal section view of a partly corrugated large diameter Super Duplex center tube.

Referring to FIG. 4 a preferred embodiment of the present invention solves this problem by modifying the upper part of the center tube 4 so that it gets less stiff. This is done by corrugating the upper part I of the center tube 4. The corrugated upper part is still surrounded by a cylindrical polyethylene sheath 7, and the annular spaces between said corrugated part and said polyethylene sheath 7 are filled with soft polymer or elastomer materials 8. This way, important advantages are obtained:

In the art it is known to corrugate stiff steel tubes to make them less bending rigidity and prone to material fatigue. This makes a steel tube more expensive and the friction on the inside increases.

A corrugated center tube 4 in an umbilical 2, limited to the upper part I, results in considerable reduced cost compared to a completely corrugated center tube 4.

A corrugated center tube 4 in an umbilical 2 limited to the upper part will result in reduced friction and therefore increased transmission capacity compared to using a completely corrugated center tube 4.

The center tube 4 in an umbilical 2 is produced by welding together tube parts of for instance 20 to 30 meters. It is therefore no problem to combine one, or some limited number, of corrugated tube parts while the rest remains smooth.

The corrugated part of the center 4 tube can be seen as an extension of the bend stiffener 1. When the umbilical 2 together with its bend stiffener 1 is exposed to dynamic motion, acceptable strain on the center tube 4 can be accomplished without the added cost of reverting to multiple center tubes 5 or a bend stiffener 1 having an excessive size.

The invention claimed is:

1. A platform comprising:
   a topside hang-off;
   a bend stiffener is fixed to the topside hang-off and extends vertically below said topside hang-off, said bend stiffener is conically tapered with a wide end on the upside near the topside hang-off and a thin end on the other side; and
   an umbilical having a center steel tube the upper end of which is also fixed to the topside hang-off, said umbilical extending downward through said bend stiffener,
   wherein the cross section of the center steel tube of said umbilical is corrugated in an upper part beginning at the upper end where said umbilical is fixed to the topside hang-off, and where said umbilical extends through said bend stiffener, and remaining corrugated for a length which is less than a total length of said bend stiffener at which point said cross section of the center steel tube is no longer corrugated, so that said center tube gets less stiff inside the bend stiffener.

2. The platform as in claim 1, wherein said center tube is made of Super Duplex steel.

3. The platform as in claim 1, wherein said center tube is sheathed with a polyethylene sheath.

4. The platform as in claim 3, wherein a volume between the corrugated part of the center tube and the polyethylene sheath is filled with elastomer or soft polymer.

5. The platform according to claim 1, wherein the cross section of the umbilical center steel tube is corrugated for a length that is 70% of the total length of said bend stiffener.

6. The platform as claimed in claim 1, wherein the center tube is produced by welding together tube parts of 20 to 30 meters.

* * * * *